(12) United States Patent
Sorenson, III

(10) Patent No.: US 12,517,880 B1
(45) Date of Patent: Jan. 6, 2026

(54) PROBABILISTIC DATA STRUCTURES EMBEDDED IN DATABASE INDEXES

(71) Applicant: Amazon Technologies, Inc., Seattle, WA (US)

(72) Inventor: James Christopher Sorenson, III, Madison, WI (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 18/067,684

(22) Filed: Dec. 16, 2022

(51) Int. Cl.
*G06F 16/901* (2019.01)
*G06F 11/14* (2006.01)
*G06F 16/22* (2019.01)
*G06F 16/23* (2019.01)
*G06F 16/27* (2019.01)

(52) U.S. Cl.
CPC ...... *G06F 16/2246* (2019.01); *G06F 11/1451* (2013.01); *G06F 16/2358* (2019.01); *G06F 16/278* (2019.01)

(58) Field of Classification Search
CPC .......................... G06F 16/901; G06F 16/9027
See application file for complete search history.

(56) References Cited

U.S. PATENT DOCUMENTS

| | | | |
|---|---|---|---|
| 8,498,995 B1 | 7/2013 | Gond et al. | |
| 8,817,541 B2 | 8/2014 | Li et al. | |
| 8,849,825 B1 | 9/2014 | Mchugh | |
| 8,972,337 B1 * | 3/2015 | Gupta | G06F 16/221 |
| | | | 707/602 |
| 9,842,132 B2 | 12/2017 | McKenna et al. | |
| 9,953,102 B2 | 4/2018 | Zhou et al. | |
| 10,133,767 B1 | 11/2018 | Cole | |
| 10,649,980 B2 | 5/2020 | Newman | |
| 11,928,099 B1 | 3/2024 | Sorenson, III et al. | |
| 2003/0163439 A1 | 8/2003 | Hankin et al. | |
| 2005/0283567 A1 | 12/2005 | Popescu-Stanesti et al. | |
| 2006/0271784 A1 | 11/2006 | Bolosky et al. | |

(Continued)

FOREIGN PATENT DOCUMENTS

| | | |
|---|---|---|
| WO | 2021037684 | 3/2021 |
| WO | 2022098725 | 5/2022 |

OTHER PUBLICATIONS

U.S. Appl. No. 18/067,692, filed Dec. 16, 2022, James Christopher Sorenson, III.

(Continued)

*Primary Examiner* — Grace Park
(74) *Attorney, Agent, or Firm* — S. Scott Foster; Kowert, Hood, Munyon, Rankin & Goetzel, P.C.

(57) ABSTRACT

Embedded probabilistic data structures may be maintained in database indexes. Different data pages linked in a database index structure may have different respective probabilistic data structures stored within the index. When an access request for the database is received, the probabilistic data structure for a particular database page that is identified as possibly storing an item for the access request may be evaluated to determine whether or not to obtain the data page. If the probabilistic data structure indicates the possible presence of the item, then the data page is obtained to perform the request. If the probabilistic data structure indicates that the item is not present, then the data page is not obtained.

20 Claims, 8 Drawing Sheets

(56) References Cited

U.S. PATENT DOCUMENTS

| | | | |
|---|---|---|---|
| 2010/0306222 A1* | 12/2010 | Freedman | G06F 16/9014 |
| | | | 707/769 |
| 2011/0307736 A1 | 12/2011 | George | |
| 2014/0082316 A1* | 3/2014 | Erdmann | G06F 16/9027 |
| | | | 711/170 |
| 2015/0268878 A1 | 9/2015 | Amit et al. | |
| 2015/0370644 A1* | 12/2015 | Graefe | G06F 11/1466 |
| | | | 707/685 |
| 2016/0085473 A1 | 3/2016 | Hershey | |
| 2018/0253468 A1 | 9/2018 | Gurajada et al. | |
| 2019/0097971 A1 | 3/2019 | Coleman | |
| 2020/0125660 A1 | 4/2020 | Shuma | |
| 2022/0229732 A1 | 7/2022 | Chitloor | |
| 2022/0269570 A1 | 8/2022 | Agarwal et al. | |

OTHER PUBLICATIONS

U.S. Appl. No. 18/439,526, filed Feb. 12, 2024, James Christopher Sorenson, III, et al.

* cited by examiner

PROBABILISTIC DATA STRUCTURES EMBEDDED IN DATABASE INDEXES

BACKGROUND

Commoditization of computer hardware and software components has led to the rise of service providers that provide computational and storage capacity as a service. At least some of these services (e.g., managed services such as managed relational database services) can be difficult to scale, including scaling the processing capacity. Disruption of an application or other process can be a high cost associated with changing capacity to better match workloads, as client applications may be interrupted due to dropped connections (and may not even retry to connect, in some instances). Techniques that can increase capacity of resources to match workloads therefore are highly desirable.

Figure 1:
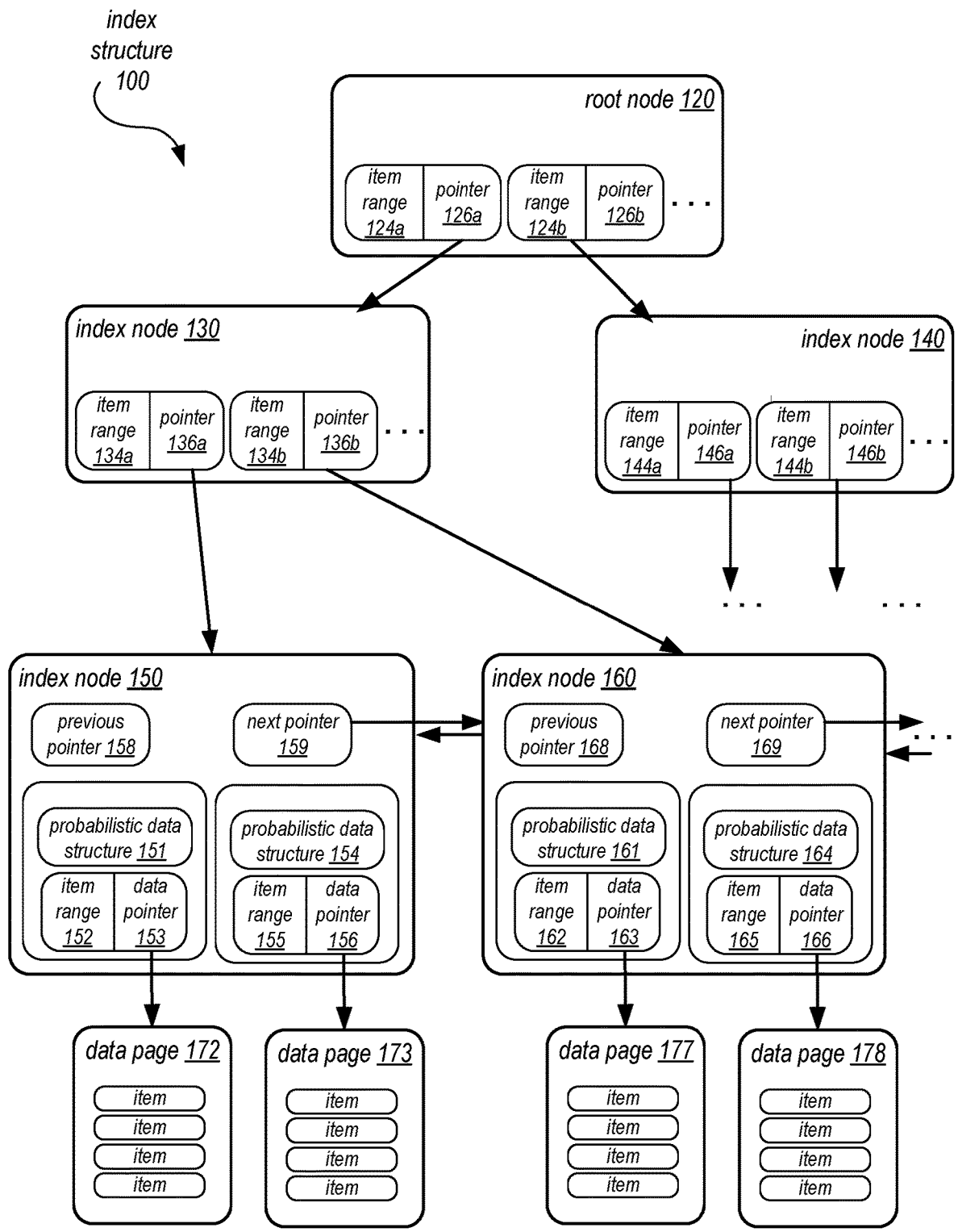
FIG. 1 is a logical block diagram illustrating probabilistic data structures embedded in database indexes, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement probabilistic data structures embedded in database indexes. Some database operations are costly to perform. For instance, database requests (e.g., queries) to access a particular item (or multiple items of data) may have to search through multiple storage locations (e.g., data pages) in order to locate an item specified in the access request. In the event the item does not exist in a searched storage location, time and capacity to perform other operations is lost. A data page, for example, may be read in its entirety using Input/Output (I/O) bandwidth to read, load, and evaluate a number of items in the data page. When large numbers of storage locations are searched these futile operations can add up to consume large numbers of computing resources and increase the time to perform the database operation.

While some techniques have used a probabilistic data structure, such as a bloom filter, to identify whether an item possibly exists in a storage location or definitely does not exist (e.g., probabilistic data structures when evaluated can provide both true and false positives but only true negatives), they can grow very large for a large number of items stored to be effective. For example, bloom filters would have to have a size proportional to the number of items in the indexed data set. A data set with 100,000 items might need a bloom filter as large as a 128 KB to get a small false positive rate.

Such large probabilistic data structures may be costly to maintain, both in terms of the storage used for the probabilistic data structure, and the operations to update the probabilistic data structure corresponding to changes to the data set. Instead, in various embodiments, techniques for embedding probabilistic data structures per storage location in a database index may be implemented. For example, tiny bloom filters may be included on each link from the internal node of a b+tree to the leaf nodes used to index database data. In some embodiments, database systems perform aggressive caching of the upper layers of an index structure, such as a b+tree, because they are accessed often. As the system traverses deeper into the index structure, the likelihood that a page is cached goes down. The leaf pages where the actual data is stored are the least likely pages to be cached. Embedding probabilistic data structures, like a bloom filter, can provide an efficient way to determine if the page does not need to be loaded, improving performance database operation. A typical leaf page may have a small number of items (e.g., a few records, such as 10 or less). As the b+tree is traversed, once the lowest level in the b+tree is reached and the leaf page that would contain the data is located, the embedded bloom filter is consulted first to see if the page should. If the evaluation of the bloom filter determines that the records are not present in the page, then the operation of reading the page can be avoided.

The implications of the performance savings for embedding probabilistic data structures per storage location in a database index may compound. For instance, database system workloads where queries or other data access requests may have significant portion (e.g., 16% of all GET queries) that do not return any data in response (e.g., the item does not exist). With this technique, many storage locations do not have to be accessed at all for a significant portion of requests.

FIG. 1 is a logical block diagram illustrating probabilistic data structures embedded in database indexes, according to some embodiments. A data set, such as a database (e.g., relational, non-relational, time series, and various other types of database) or other collection of data items, may be stored according to an index structure 100. For example, a tree-based index structure (e.g., a b+tree or other index structure that links to separate data pages or other separate storage locations from index storage locations (e.g., an index page)) may be used, in some embodiments. This index structure 100 may have a root node 120 which indicates where to locate items with values in an item range by following a corresponding pointer. Items in a data set may include various features, attributes, columns, records, or values according to the type of data set. In some embodiments, a data set may store items that contain one or more key-value pairs. A key may store an identifier used to lookup the value paired with the key.

Items in item range 124a, for example, may be found by following pointer 126a, while items in item range 124b may be found by following pointer 126b). Note that in some embodiments, item ranges, like item range 124a and 124b may be indicated by keys. For example, item range 124a may be represented as "3" where items with keys less than and including "3" are found following the pointer 126a, whereas item range 124b may be represented as "10" so that keys greater than "3" and less than or equal to "10" are found following pointer 126b. Similar item range representations can be found in other nodes in the index structure (e.g., index nodes 130 and 140), in some embodiments.

Multiple nodes may be used to implement index structure 100. For example internal index nodes 130 and 140 may each respectively further subdivide their respective item ranges again (from 124a and 124b above) as item range 134a, item range 134b, item range 144a, and item range 144b (with respective pointers 136a, 136b, 146a, and 146b). Internal nodes may, in some embodiments, point to further index nodes, such as index nodes 150 and 160. These index nodes may point to data pages, such as data pages 172, 173, 177, and 178 via respective pointers 153, 156, 163, and 166. An example of a data page format is discussed below with regard to FIG. 5, though various other data page formats can be used in other embodiments. These index nodes may include previous pointers 158 and 168 and next pointers 159 and 169 to point to previous and next index nodes (which are ordered according to the items (e.g., keys) in index structure 100.

As indicated at 151, 154, 161, and 164, embedded probabilistic data structures may be maintained to indicate the presence of an item in the linked data page specific to that probabilistic data structure. For example, probabilistic data structure 154 may indicate the presence of an item in data page 173, but not data page 172, and probabilistic data structure 151 may indicate the presence of an item in data page 172, but not data page 173. Similarly for index node 160, probabilistic data structure 164 may indicate the presence of an item in data page 178, but not data page 177, and probabilistic data structure 161 may indicate the presence of an item in data page 177, but not data page 178. Because index nodes 150 and 160 link to multiple data pages, item ranges 152, 155, 162, and 165 may describe the range of items in the respectively linked data pages. Index nodes may have varying numbers of linked data pages which may differ between index pages. For instance, index node 150 could be linked to 50 data pages and index node 160 could be linked to 35 data pages.

Please note that previous descriptions of an index structure and embedded probabilistic data structures are not intended to be limiting, but are merely provided as logical examples.

This specification continues with a general description of a provider network that may implement a database service that may implement probabilistic data structures embedded in database indexes. Then various examples of a database service are discussed, including different components/modules, or arrangements of components/module, that may be employed as part of implementing the database service, in some embodiments. A number of different methods and techniques to implement probabilistic data structures embedded in database indexes are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
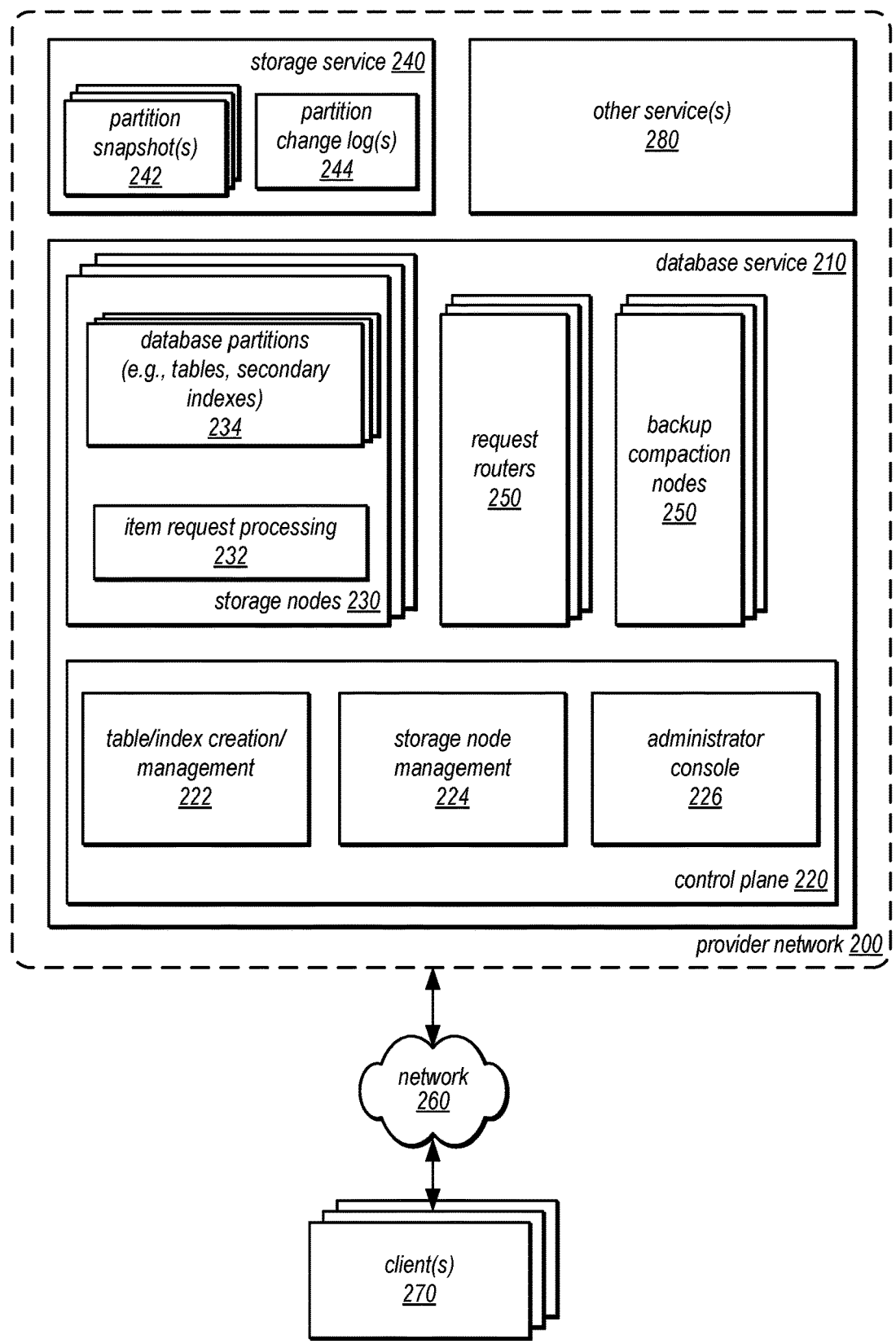
FIG. 2 is a logical block diagram illustrating a provider network offering a database service that may implement probabilistic data structures embedded in database indexes, according to some embodiments.

FIG. 2 is a logical block diagram illustrating a provider network offering a database service that may implement probabilistic data structures embedded in database indexes, according to some embodiments. Provider network 200 may be a private or closed system, in some embodiments, or may be set up by an entity such as a company or a public sector organization to provide one or more services (such as various types of cloud-based storage) accessible via the Internet and/or other networks to clients 270, in another embodiment. In some embodiments, provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network 200. In some embodiments, provider network 200 may implement various computing resources or services, such as database service 210 (e.g., a non-relational (NoSQL) database, relational database service or other database service that may utilize collections of items (e.g., tables that include items)), and other services (not illustrated), such as data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 8 and described below. In some embodiments, the functionality of a given system or service component (e.g., a component of database service 210) may be implemented by a particular node or may be distributed across several nodes. In some embodiments, a given node may implement the functionality of more than one service system component (e.g., more than one data store component).

Database service 210 may implement various types of distributed database services, in some embodiments, for storing, accessing, and updating data in tables hosted in a database. Such services may be enterprise-class database systems that are highly scalable and extensible. In some embodiments, access requests (e.g., requests to get/obtain items, put/insert items, delete items, update or modify items, scan multiple items) may be directed to a table in database service 210 that is distributed across multiple physical resources, and the database system may be scaled up or down on an as needed basis. In some embodiments, clients/subscribers may submit requests in a number of ways, e.g., interactively via graphical user interface (e.g., a console) or a programmatic interface to the database system. In some embodiments, database service 210 may provide a RESTful programmatic interface in order to submit access requests (e.g., to get, insert, delete, or scan data). In some embodiments, a query language (e.g., Structured Query Language (SQL)) may be used to specify access requests.

In some embodiments, clients 270 may encompass any type of client configurable to submit network-based requests to provider network 200 via network 260, including requests for database service 210 (e.g., to access item(s) in a table or secondary index in database service 210). For example, in some embodiments a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in database service 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in some embodiments. In some embodiments, client 270 may generate network-based services requests according to a Representational State Transfer (REST)-style network-based services architecture, a document- or message-based network-based services architecture, or another suitable network-based services architecture. Note that in some embodiments, clients of database service 210 may be implemented within provider network 200 (e.g., applications hosted on a virtual compute service).

In some embodiments, clients of database service 210 may be implemented on resources within provider network 200 (not illustrated). For example, a client application may be hosted on a virtual machine or other computing resources implemented as part of another provider network service that may send access requests to database service 210 via an internal network (not illustrated).

In some embodiments, a client 270 may provide access to provider network 200 to other applications in a manner that is transparent to those applications. For example, client 270 may integrate with a database on database service 210. In such an embodiment, applications may not need to be modified to make use of a service model that utilizes database service 210. Instead, the details of interfacing to the database service 210 may be coordinated by client 270.

Client(s) 270 may convey network-based services requests to and receive responses from provider network 200 via network 260, in some embodiments. In some embodiments, network 260 may encompass any suitable combination of networking hardware and protocols necessary to establish network-based-based communications between clients 270 and provider network 200. For example, network 260 may encompass the various telecommunications networks and service providers that collectively implement the Internet. In some embodiments, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in some embodiments, client(s) 270 may communicate with provider network 200 using a private network rather than the public Internet.

Database service 210 may implement request routers 250, in some embodiments. Request routers 250 may receive and parse client access requests, in various embodiments in order to determine various features of the request, to parse, authenticate, throttle and/or dispatch access requests, among other things, in some embodiments. Database service 210 may implement backup compaction nodes 250, which may perform compaction techniques including the generation of new data objects and merged data objects, as discussed in detail below with regard to FIGS. 3 and 4.

In some embodiments, database service 210 may implement control plane 220 to implement one or more administrative components, such as automated admin instances or nodes (which may provide a variety of visibility and/or control functions). In various embodiments, control plane 220 may direct the performance of different types of control plane operations among the nodes, systems, or devices implementing database service 210, in some embodiments. Control plane 220 may provide visibility and control to system administrators via administrator console 226, in some embodiment. Administrator console 226 may allow system administrators to interact directly with database service 210 (and/or the underlying system). In some embodiments, the administrator console 226 may be the primary point of visibility and control for database service 210 (e.g., for configuration or reconfiguration by system administrators). For example, the administrator console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a table, at database service 210, in some embodiments.

Storage node management 224 may provide resource allocation, in some embodiments, for storing additional data in table submitted to database service 210. For instance, control plane 220 may communicate with storage nodes 230 to initiate the performance of various control plane operations, such as moves of table partitions, merges of table partitions, splits of table partitions, update tables, delete tables, create secondary indexes, etc. . . . . . In some embodiments, control plane 220 may include a node recovery feature or component that handles failure events for storage nodes 230, propagation architectures 290 and request routers 250 (e.g., adding new nodes, removing failing or underperforming nodes, deactivating or decommissioning underutilized nodes, etc).

Various durability, resiliency, control, or other operations may be directed by control plane 220. For example, storage node management 224 may detect merge, split, copy, or move events for partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical file system mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

In some embodiments, each database partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault.

Control plane 220 may implement table/index creation and management 222 to manage the creation (or deletion) of database tables and/or secondary indexes hosed in database service 210, in some embodiments. For example, a request to create a secondary index may be submitted via administrator console 226 (or other database service 210 interface) which may initiate performance of a workflow to generate appropriate system metadata (e.g., a table identifier that is unique with respect to all other tables in database service 210, secondary index performance or configuration parameters, and/or various other operations for creating a secondary index as discussed below). Backup management (not illustrated) may handle or manage backup requests to make copies as of a version or point-in-time of a database, as partition snapshots 242 and partition change log(s) 244 that together makeup partition backup(s) 241 in storage service 240 which may be used to perform an offline build of a replicated data set like a secondary index.

In some embodiments, database service 210 may also implement a plurality of storage nodes 230, each of which may manage one or more partitions of a database table or secondary index on behalf of clients/users or on behalf of database service 210 which may be stored in database storage 234 (on storage devices attached to storage nodes 230 or in network storage accessible to storage nodes 230). Partitions may, in various embodiments, store database data in an index structure that uses embedded probabilistic data structures, as discussed above with regard to FIG. 1.

Storage nodes 230 may implement item request processing 232, in some embodiments. Item request processing 232 may perform various operations (e.g., read/get, write/update/modify/change, insert/add, or delete/remove) to access individual items stored in tables in database service 210, in some embodiments. Storage nodes 232 may evaluate index structures and include, as part of the evaluation, an evaluation of a probabilistic data structure, as discussed in detail below with regard to FIGS. 6 and 7. In some embodiments, item request processing 232 may support operations performed as part of a transaction, including techniques such as locking items in a transaction and/or ordering requests to operate on an item as part of transaction along with other requests according to timestamps (e.g., timestamp ordering) so that storage nodes 230 can accept or reject the transaction-related requests. In some embodiments, item request processing 232 may maintain database partitions 234 according to a database model (e.g., a non-relational, NoSQL, or other key-value database model).

In some embodiments, database service 210 may provide functionality for creating, accessing, and/or managing tables or secondary indexes at nodes within a multi-tenant environment. For example, database partitions 234 may store table item(s) from multiple tables, indexes, or other data stored on behalf of different clients, applications, users, accounts or non-related entities, in some embodiments.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of particular portion of data (e.g., a partition) for the database service 210. In some embodiments, a replica group may include a primary storage node which may act as, for instance, a read-write node, for the partition. As discussed in detail below with regard to FIG. 3, a primary storage node of a replica group may also be involved in the management of Moreover, different replica groups may utilize overlapping nodes, where a storage node 230 may be a member of multiple replica groups, maintaining replicas for each of those groups whose other storage node 230 members differ from the other replica groups.

Different models or formats for storing data for database tables in database service 210 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more key-value pairs, in any order, in some embodiments. In some embodiments, each attribute in an item may have a key, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s) and version attributes, in some embodiments. In some embodiments, the tables maintained by the database service 210 (and the underlying storage system) may have no pre-defined format other than their reliance on the primary key.

Metadata or other system data for tables may also be stored as part of database partitions using similar partitioning schemes and using similar indexes, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes, and create and/or associate functions with tables. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Storage service 240 may be file, object-based, or other type of storage service that may be used to store partition snapshots 242 as backups 241. Storage service 240 may implement striping, sharding, or other data distribution techniques so that different portions of a partition backup 241 are stored across multiple locations (e.g., at separate nodes). In at least some embodiments, update logs 244 (e.g., created by updates for database partitions 234 by item request processing 232) may be stored as objects in storage service 240.

Figure 3:
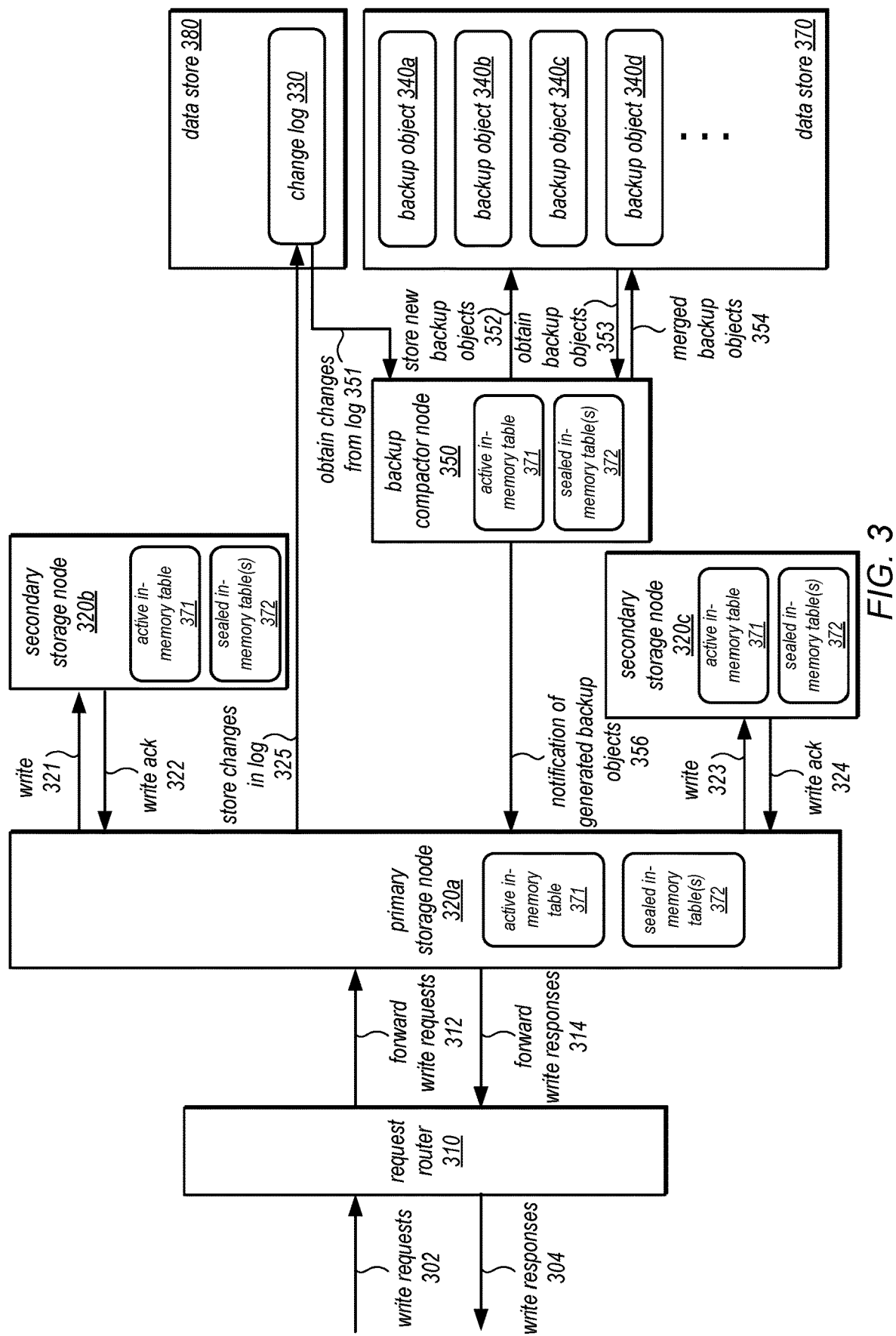
FIG. 3 is a logical block diagram illustrating interactions between storage nodes and backup compactor nodes, according to some embodiments.

FIG. 3 is a logical block diagram illustrating interactions between storage nodes and backup compactor nodes, according to some embodiments. Write requests 302 may be received at request router 310 and forwarded 312 to the appropriate primary storage node for the partition to which the write is directed. Primary storage nodes 320*a* may utilize a replication protocol to perform the write (e.g., by sending the write to secondary storage nodes 320*b* and 320*c* respectively, as indicated at 321 and 323). Acknowledgments, such as acks 322 and 324 may be returned to indicate to primary storage node 320*a* that the write completed successfully (e.g., to satisfy a quorum or other durability requirement). Primary storage node 320*a* may then forward a write response (or failure) as indicated at 314 to request router 310, which may return the write responses 304.

Primary storage node 320*a* may store changes in a change log 330 data store 380, as indicated at 325. For example, data store 380 may be an append only data store (e.g., a streaming data store). Primary storage node 320*a* may maintain an active in-memory table 371 and (if not determined to be flushed to data store 370) sealed in-memory table(s) 372. These active in-memory tables 371 and sealed in-memory table(s) 372 may be similar to those discussed below with regard to FIG. 5. Each secondary storage node 320*b* and 320*c* and backup compactor node 350 may maintain respective copies.

As discussed below with regard to FIG. 5, backup node compactor 350 may generate new data objects, sometimes referred to as backup objects, by obtaining 351 the changes from the change log 330. In some embodiments, the changes 351 may indicate a sealed in-memory table (as determined by primary storage node 320*a* according to a detected triggering event as discussed below), such as one of sealed in-memory tables 372. Backup compactor node 350 may then generate a new backup object corresponding to the sealed in-memory table 372 (as described in the change log), and store 352 the backup object as part of backup objects 340*a*, 340*b*, 340*c*, 340*d*, and so on, in storage service 240.

A notification of the backup object being stored may be returned, as indicated at 356 which may allow primary storage node 320*a* (and secondary storage nodes 320*b* and 320*c*) to discard the sealed in-memory table 372, freeing up memory. Moreover, notification 356 may indicate to primary storage node 320*a* (and secondary storage nodes 320*b* and 320*c*) that the backup object can be obtained from storage service 370 (if desirable). Backup compactor node 350 may also compact backup objects according to the techniques discussed below with regard to FIG. 4, by obtaining backup objects 353 and storing merged backup objects 354.

Figure 4:
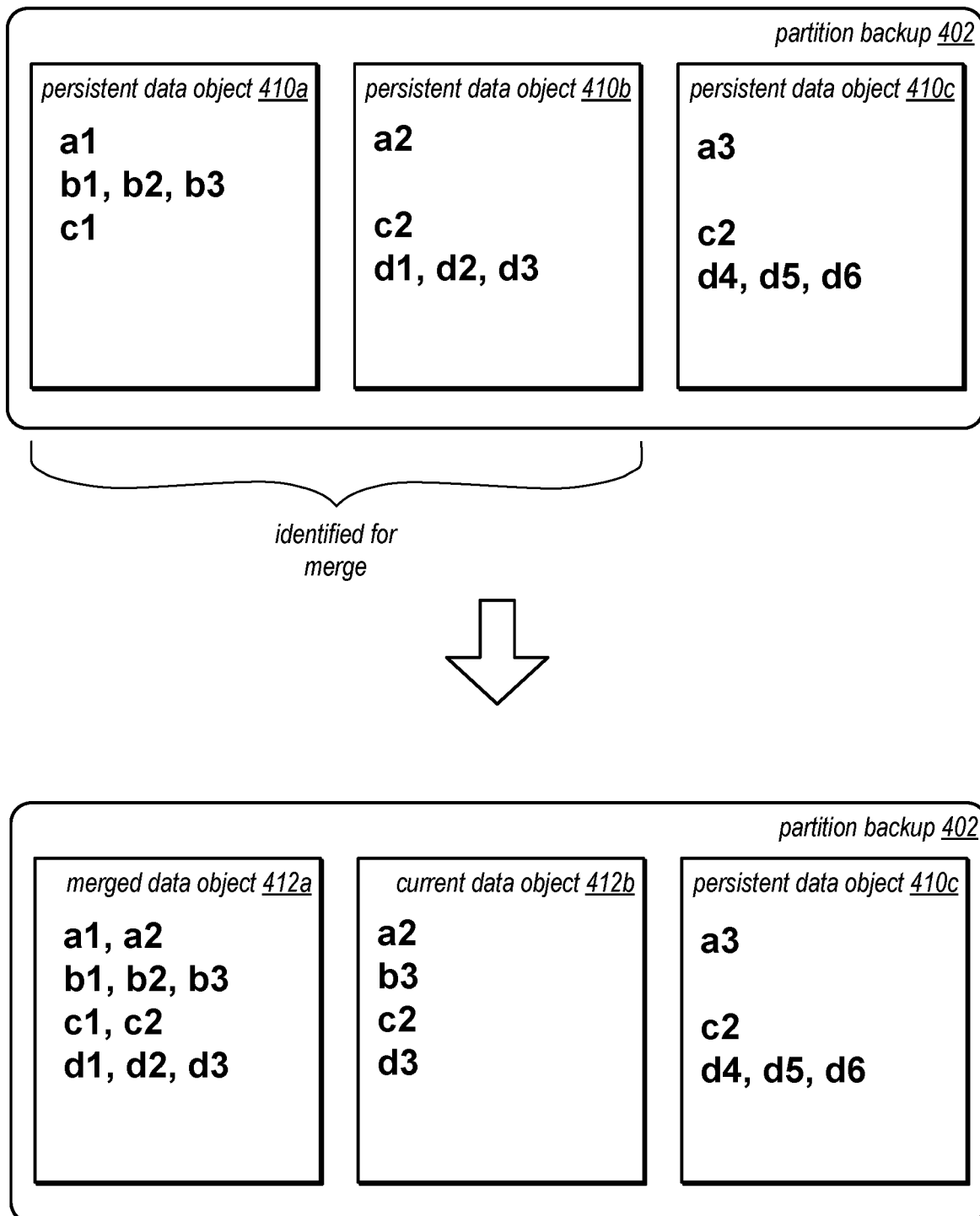
FIG. 4 is a logical block diagram illustrating compaction of backup blocks that sort items according to value and time, according to some embodiments.

FIG. 4 is a logical block diagram illustrating compaction of backup blocks that sort items according to value and time, according to some embodiments. Partition backup 402 may be a collection of persistent data objects 410*a*, 410*b*, and 410*c*, stored as discussed above with regard to data object 140. Each data object 410 may store the different versions of items, sorted according to time and key (e.g., key "b" is sorted according to time of "b1" then "b2" and then "b3" in persistent data object 410*a*). Moreover, each persistent data object 410 may correspond to a different range of time (e.g., no updates in the range of time for persistent data object 410*b* were received for key "b"). Thus, persistent data objects may store keys within the entire space of a partition, but may have a specific range of time that includes the oldest and newest updates described therein.

Two (or more) data objects 410 may be identified for merge, such as data objects 410*a* and 410*b*. Various techniques may be used to identify persistent data objects for merge. For example, one technique may be leveled compaction. Each persistent data object in this technique would be associated with a level. A persistent data object that is newly flushed from an in-memory table would have a level=0. Every time a persistent data object is compacted (and thus merged with another persistent data object), its level would increment by 1. A level's compaction could be triggered once the number of data objects on that level reaches X (e.g., 2). Thus, in the illustrated example in FIG. 4, both persistent data object data objects 410*a* and 410*b* would be 2 objects at level=1, and so both would be compacted and merged, with merged data object 412*a* having a level=2. In this way, compaction may continue to merge persistent data objects over time. Consider an example configuration, where level-0 is a sealed memtable, level-1 is two 64 MB files, level-1 is two 128 MB files, level-3 is two 256 MB files, level-4 is two 512 MB files, and so on. In some embodiments, compaction may merge all persistent data objects into a single persistent data object.

Compaction techniques may create two data objects to replace the merged data objects, a merged data object 412*a*, which may store the items in both data objects, sorted according to value and time, while not retaining any items whose time value is not within a retention threshold (e.g., 30 days). In this way, the partition backup 402 may still preserve the ability to do point in time or other restores within the retention threshold. The merged data object 412*a* may include a similar structure to that discussed below with regard to FIG. 5, including a new root page, encode page, metadata page, index pages, and data pages. Current data object 412*b* may store those item key values that are the latest according to time in the merged data objects. As discussed below with regard to FIG. 7, compaction may be an event that triggers recreation of probabilistic data structures as part of generating new index pages.

Figure 5:
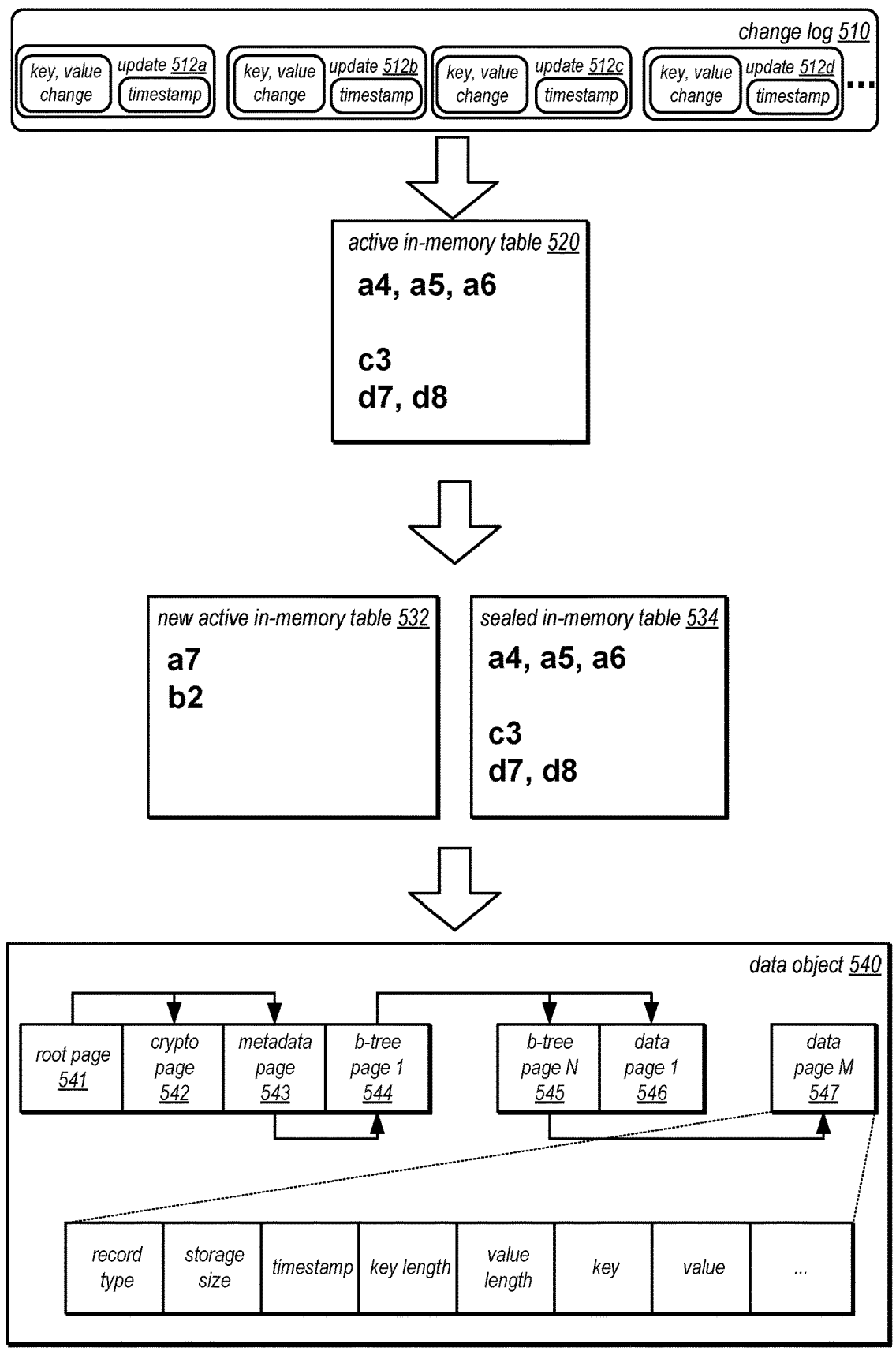
FIG. 5 is a logical block diagram illustrating time and value ordered data objects for a backup of a data set that include embedded probabilistic data structures, according to some embodiments.

FIG. 5 is a logical block diagram illustrating time and value ordered data objects for a backup of a data set that include embedded probabilistic data structures, according to some embodiments. A data set, such as a database (e.g., relational, non-relational, time series, and various other types of database) or other collection of data items, may be stored in a format in data objects (e.g., files or other data structures) in storage to provide persistent storage (e.g., a backup copy) of the data set, which may be accessed for various operations. When changes to the data set are received, the may be recorded (and in some embodiments persisted) in a change log, such as change log 510.

Items in a data set may include various features, attributes, columns, records, or values according to the type of data set. In some embodiments, a data set may store items that contain one or more key-value pairs. A key may store an identifier used to lookup the value paired with the key. Change log 510 may include various updates that describe received changes, such as updates 512*a*, 512*b*, 512*c*, and 512*d*, which include respective keys (or other item value identifier), changes to the value paired with the key (modifications of the value, insertions of the key and value, or removal of the key and value), and assigned time values (e.g., timestamps). Multiple versions of the same item (e.g., with the same key), may be included in change log 510 as each update 512 may represent a change to that item over time (e.g., corresponding to different timestamps).

In addition to change log 510, an active in-memory table 520 may be maintained (e.g., at a node, system, or other component that performs reads and/or writes to the data set), such as a primary storage node as discussed below with regard to FIG. 3. Active in-memory table 520 may be updated in accordance with change log 510, obtaining new updates and including the different updates in the active-inmemory table 520. For example, the "a" item (e.g., key "a") may have the value of key "a" change over time, and thus may have different values at different timestamps. Thus active in-memory table 520 may store the different versions of the key over time (e.g., a4, a5, a6, c3, d7, and d8).

In some embodiments, a trigger event or other condition may cause the active in-memory table to be sealed (e.g., no longer able to be written) or otherwise made immutable to further updates. Meanwhile, new changes to the data set stored in change log 510 may be written to new active in-memory table 532, such as a modification to key a, recorded as "a7" and to key "b" as "b2". Sealed in-memory table 524 may thus preserve the items, including key value pairs and respective time stamps. While new changes to the data set stored in change log 510 may be written to new active in-memory table 532.

To preserve the data from sealed in-memory table 534, a new data object 540 (e.g., a file or other data storage unit, collection, or object) may store the items of sealed in-memory table 534 in key value and time ordering (e.g., a1, then a2, then a3, and so on). Data object 540 may implement root page 541 which identifies locations of encode page 542 (e.g., indicating the presence and type of encryption and/or compression of data object 540 for one or more index and/or data pages and, which may also allow for different encryption and/or compression techniques to be applied to the pages), metadata page 543 containing metadata about the data object 540, index pages 544 through 545 (e.g., b-tree or other index structure pages that link to data pages) which organize the items to be sorted in key value and time order and may include respectively embedded probabilistic data structures for linked data pages, and data pages 546 through 547, which may include the items (e.g., record type, storage size, timestamp, key length, key value pair and among other possible information). An example layout of a data page is illustrated, including fields of record type, storage size, timestamp, key length, key, value, cyclic redundancy check (CRC) value(s) and so on). In some embodiments, a key and values may be stored as an array of byte arrays. In some embodiments, multiple data objects, including new data object 540 may be stored together to make up a backup of the data set (e.g., of a partition of a database). For example, each of the multiple data objects may together implement a log-structured merge tree (sometimes referred to as an LSM tree).

Figure 6:
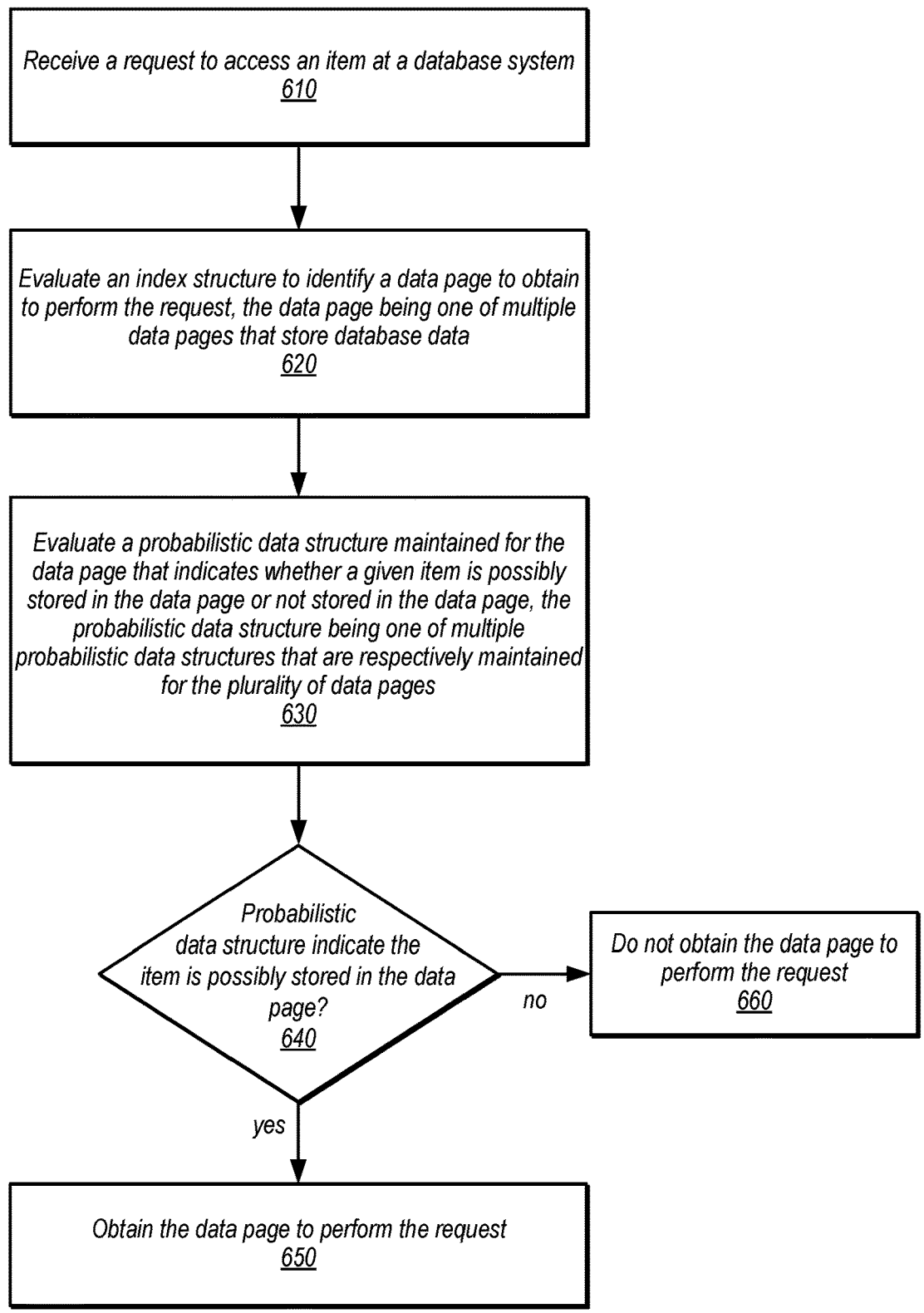
FIG. 6 is a high-level flowchart illustrating various methods and techniques to implement probabilistic data structures embedded in database indexes, according to some embodiments.

The examples of a database that implements implement probabilistic data structures embedded in database indexes as discussed in FIGS. 2-5 above have been given in regard to a database service (e.g., a relational database, a document database, a non-relational database, etc.). However, various other types of database systems or storage systems can advantageously implement probabilistic data structures embedded in database indexes, in other embodiments. FIG. 6 is a high-level flowchart illustrating various methods and techniques to implement probabilistic data structures embedded in database indexes, according to some embodiments. These techniques, as well as the techniques discussed with regard to FIG. 7, may be implemented using components or systems as described above with regard to FIGS. 2-5, as well as other types of databases or storage systems, and thus the following discussion is not intended to be limiting as to the other types of systems that may implement the described techniques.

As indicated at 610, a request may be received to an access an item at a database system, in some embodiments. For example, the request may be specified according to a query language, such as Structured Query Language (SQL), or may be specified according to a programmatic interface (e.g., an API to GET an item). In some embodiments, the request to access the item could be a request to modify (e.g., change a value) or delete the item. The database system may be one of many different types of database system, such as a standalone database system or a database service (e.g., a storage node of database service 210).

As indicated at 620, an index structure for database data may be evaluated to identify a data page to obtain to perform the request, in some embodiments. For example, an index structure like the tree depicted in FIG. 1, may be traversed using item ranges an pointers until a data page is identified. The data page may be one of many data pages that store database data and may, in some scenarios, be one of many data pages that are identified to obtain.

As indicated at 630, a probabilistic data structure maintained for the data page may be evaluated that indicates whether a given item is possibly stored in the data page (e.g., a true or false positive result of yes the given item is stored) or not stored (e.g., a true negative result of no the given item is not stored), in some embodiments. As discussed above with regard to FIG. 1, the probabilistic data structure can be one of many different types of probabilistic data structures (e.g., bloom filter, skip list, cuckoo filter, count-min sketch, etc.). Moreover, as illustrated above in FIG. 1, multiple probabilistic data structures are maintained, such that one is maintained for each data page. Evaluation of the probabilistic data structure may depend on its type. A bloom filter, for example, may be evaluated by applying one or more hash functions to an input value (e.g., the key or value of a key value pair) to determine a hash value which is then used to check for the presence of a "1" value in corresponding locations in the bloom filter (e.g., an array of bits with values of "0" or "1"). If each of the identified locations has a "1" value, then the bloom filter may indicate the item as present.

As indicated by the negative output from 640, the data page is not obtained to perform the request if the probabilistic data structured indicates the item is not possibly stored in the data page, as indicated at 660. Evaluations for other data pages may be performed, or in some embodiments, a response to the request may be returned indicating that the item is not present in the database. As indicated at 650, the data page is obtained to perform the request if the item is indicated as present. For example, the data page may be read from persistent storage into memory, evaluated to identify the item out of the multiple items in the data page and the data in the found item used. In some scenarios, a false positive may be provided by the probabilistic data structure. In those scenarios, a response indicating that the item is not present in the database may be sent.

Figure 7:
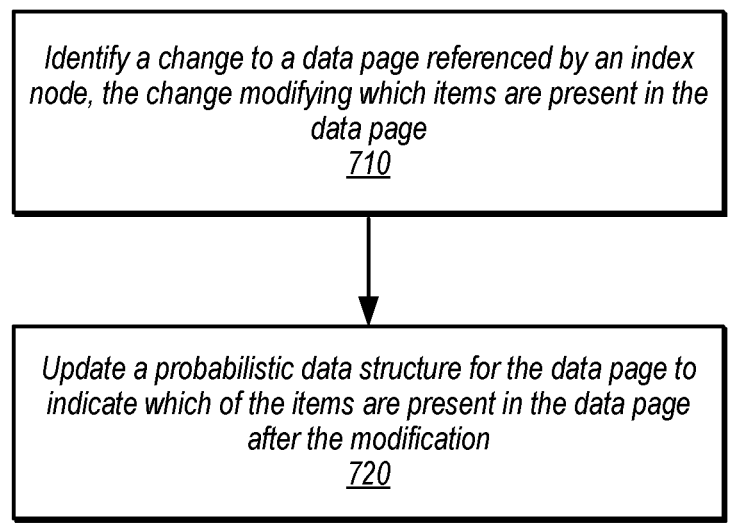
FIG. 7 is a high-level flowchart illustrating various methods and techniques to implement updating an embedded probabilistic data structure in an index, according to some embodiments.

FIG. 7 is a high-level flowchart illustrating various methods and techniques to implement updating an embedded probabilistic data structure in an index, according to some embodiments. As indicated at 710, a change to a data page referenced by an index node may be identified, in some embodiments. For example, the change may modify which items are present in the data page (e.g., a compaction technique as discussed above or other the addition or deletion of items). In some embodiments not all changes may cause an update to a probabilistic data structure. For example, a deletion of an item from a data page would not have to trigger an update, as the false positive that would be returned by the probabilistic data structure would still be a valid behavior for the probabilistic data structure. However, if a new item is added, then the probabilistic data structure would be updated because false negatives (e.g., scenarios where the item is present but not indicated by the probabilistic data structure) would be returned, and false negatives are not expected behaviors of probabilistic data structures.

As indicated at 720, the probabilistic data structure for the data page may be updated to indicate which of the items are present in the data page after the modification. For example, in a bloom filter, the items now present may be used to regenerate the bloom filter, by reapplying the hash function (s) to the items and setting the appropriate bits.

The methods described herein may in various embodiments be implemented by any combination of hardware and software. For example, in some embodiments, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 8:
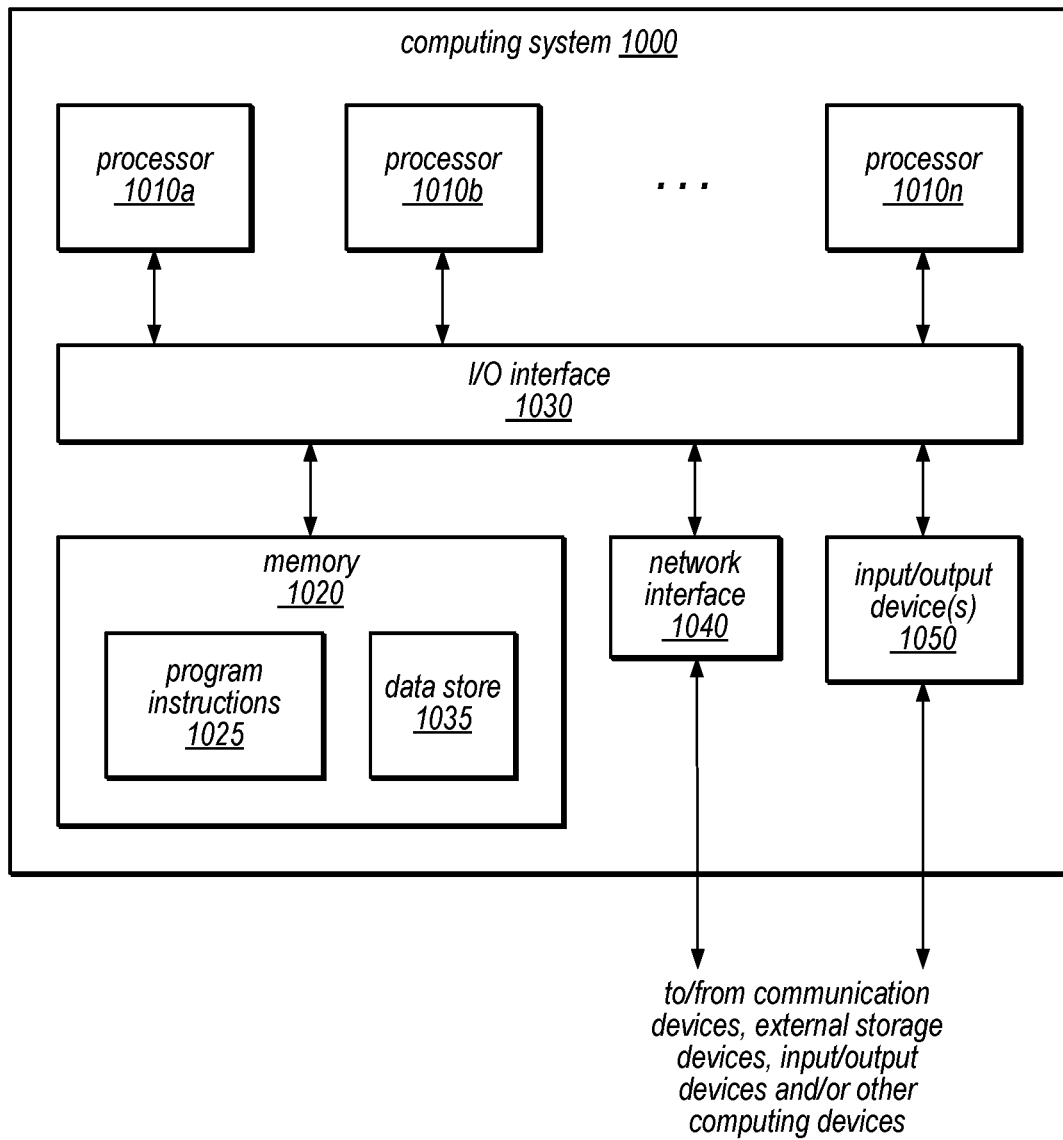
FIG. 8 is a block diagram illustrating an example computing system, according to some embodiments.

Embodiments to implement probabilistic data structures embedded in database indexes as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1000, while in other embodiments multiple such systems, or multiple nodes making up computer system 1000, may host different portions or instances of embodiments. For example, in some embodiments some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in some embodiments. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1020 may store program instructions 1025 and/or data accessible by processor 1010 to implement the techniques described above, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to perform offline builds for projected data subsets are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in some embodiments.

In some embodiments, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in some embodiments. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in some embodiments. Multiple input/output devices 1050 may be present in computer system 1000 or may be distributed on various nodes of computer system 1000, in some embodiments. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various embodiments of the systems as described herein, and data store 1035, comprising various data accessible by program instructions 1025, in some embodiments. In some embodiments, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
  at least one processor; and
  a memory, storing program instructions that when executed on or across the one or more computing devices, cause the one or more computing devices to implement a database system, configured to:
    receiving a request to access an item;
    perform the request to access the item, wherein to perform the request, the database system is configured to:
      traverse an index structure comprising a plurality of index nodes, wherein the traversal identifies both:
        an index node that references a data page to obtain to perform the request, wherein the data page is one of a plurality of data pages that store database data; and
        a probabilistic data structure maintained for the data page within the index node out of a plurality of probabilistic data structures that are separately stored for the plurality of data pages within different ones of the plurality of index nodes;
      evaluate the probabilistic data structure maintained for the data page within the index node to determine that the data page should not be obtained as part of performing the request, wherein the probabilistic data structure indicates whether a given item is possibly stored in the data page or not stored in the data page.

2. The system of claim 1, wherein the database system is further configured to:
receive a different request to access a different item;
perform the different request to access the different item, wherein to perform the request, the database system is configured to:
traverse the index structure that includes the index node to identify the data page to obtain to perform the different request;
evaluate the probabilistic data structure maintained for the data page to determine that the data page should be obtained as part of performing the different request; and
obtain the data page to perform the different request to access the different item.

3. The system of claim 1, wherein the database system is further configured to update the probabilistic data structure for the data page according to a change modifying which items are present in the data page.

4. The system of claim 1, wherein the database system is further configured to generate a new probabilistic data structure in the database data as part of compacting one or more data object files stored as part of a backup of the data base.

5. A method, comprising:
receiving a request to access an item at a database system;
performing, by the database system, the request to access the item, comprising:
evaluating, by the database system, an index structure comprising a plurality of index nodes, wherein the evaluating identifies both:
an index node for a data page to obtain to perform the request, wherein the data page is one of a plurality of data pages that store database data; and
a probabilistic data structure maintained for the data page within the index node out of a plurality of probabilistic data structures that are separately stored for the plurality of data pages within different ones of the plurality of index nodes;
evaluating, by the database system, the probabilistic data structure maintained for the data page within the index node to determine that the data page should not be obtained as part of performing the request, wherein the probabilistic data structure indicates whether a given item is possibly stored in the data page or not stored in the data page.

6. The method of claim 5, further comprising:
receiving a different request to access a different item at the database system;
performing, by the database system, the different request to access the different item, comprising:
evaluating, by the database system, the index structure to identify the data page to obtain to perform the different request;
evaluating, by the database system, the probabilistic data structure maintained for the data page to determine that the data page should be obtained as part of performing the different request; and
obtaining, by the database system, the data page to perform the different request to access the different item.

7. The method of claim 5, wherein the probabilistic data structure is a bloom filter.

8. The method of claim 5, wherein the index structure is a b+tree.

9. The method of claim 5, further comprising updating the probabilistic data structure for the data page according to a change modifying which items are present in the data page.

10. The method of claim 5, further comprising generating a new probabilistic data structure in the database data as part of compacting one or more data object files stored as part of a backup of the data base.

11. The method of claim 5, wherein the index structure is stored as part of a data object generated from a change log for the database data that is stored as part of a backup of the database data and wherein the database data is a partition of a database.

12. The method of claim 5, wherein the database system is implemented as part of a non-relational database service offered by a provider network.

13. One or more non-transitory, computer-readable storage media, storing program instructions that when executed on or across one or more computing devices cause the one or more computing devices to implement:
receiving a request to access an item at a database system;
performing, by the database system, the request to access the item, comprising:
evaluating, by the database system, an index structure comprising a plurality of index nodes, wherein the evaluating identifies both:
an index node for a data page to obtain to perform the request, wherein the data page is one of a plurality of data pages that store database data; and
a probabilistic data structure maintained for the data page within the index node out of a plurality of probabilistic data structures that are separately stored for the plurality of data pages within different ones of the plurality of index nodes; and
evaluating, by the database system, probabilistic data structure maintained for the data page within the index node to determine that the data page should not be obtained as part of performing the request, wherein the probabilistic data structure indicates whether a given item is possibly stored in the data page or not stored in the data page.

14. The one or more non-transitory, computer-readable storage media of claim 13, storing further instructions that when executed on or across the one or more computing devices, cause the one or more computing devices to further implement:
receiving a different request to access a different item at the database system;
performing, by the database system, the different request to access the different item, comprising:
evaluating, by the database system, the index structure to identify the data page to obtain to perform the different request;
evaluating, by the database system, the probabilistic data structure maintained for the data page to determine that the data page should be obtained as part of performing the different request; and
obtaining, by the database system, the data page to perform the different request to access the different item.

15. The one or more non-transitory, computer-readable storage media of claim 13, wherein the probabilistic data structure is a bloom filter.

16. The one or more non-transitory, computer-readable storage media of claim 13, storing further instructions that when executed on or across the one or more computing devices, cause the one or more computing devices to further implement updating the probabilistic data structure for the data page according to a change modifying which items are present in the data page.

17. The one or more non-transitory, computer-readable storage media of claim 13, wherein the index structure is a b+tree.

18. The one or more non-transitory, computer-readable storage media of claim 13, storing further instructions that when executed on or across the one or more computing devices, cause the one or more computing devices to further implement generating a new probabilistic data structure in the database data as part of compacting one or more data object files stored as part of a backup of the data base.

19. The one or more non-transitory, computer-readable storage media of claim 13, wherein the index structure is stored as part of a data object generated from a change log for the database data that is stored as part of a backup of the database data and wherein the database data is a partition of a database.

20. The one or more non-transitory, computer-readable storage media of claim 13, wherein the database system is implemented as part of a relational database service offered by a provider network.

\* \* \* \* \*